(12) United States Patent
Fujii

(10) Patent No.: US 12,283,886 B2
(45) Date of Patent: Apr. 22, 2025

(54) DC/DC CONVERTING DEVICE INCLUDING FLYING CAPACITOR CIRCUITS

(71) Applicant: Panasonic Intellectual Property Management Co., Ltd., Osaka (JP)

(72) Inventor: Naoaki Fujii, Kagoshima (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 182 days.

(21) Appl. No.: 17/636,672

(22) PCT Filed: Jun. 22, 2020

(86) PCT No.: PCT/JP2020/024286
§ 371 (c)(1),
(2) Date: Feb. 18, 2022

(87) PCT Pub. No.: WO2021/033412
PCT Pub. Date: Feb. 25, 2021

(65) Prior Publication Data
US 2022/0286049 A1    Sep. 8, 2022

(30) Foreign Application Priority Data
Aug. 21, 2019    (JP) .................................. 2019-151285

(51) Int. Cl.
H02M 3/158    (2006.01)
(52) U.S. Cl.
CPC .................................. H02M 3/158 (2013.01)

(58) Field of Classification Search
CPC ...................................................... H02M 3/158
See application file for complete search history.

(56) References Cited

U.S. PATENT DOCUMENTS

| 7,948,221 | B2 | 5/2011 | Watanabe et al. |
| 9,077,241 | B2 | 7/2015 | Haddad |
| 11,411,491 | B2 | 8/2022 | De et al. |
| 2008/0211316 | A1 | 9/2008 | Watanabe et al. |

(Continued)

FOREIGN PATENT DOCUMENTS

| CN | 102185359 A | 9/2011 |
| CN | 102651612 A | 8/2012 |

(Continued)

OTHER PUBLICATIONS

Extended European Search Report issued from corresponding European Application No. 20854782.8 dated Sep. 14, 2022 (11 pages).

(Continued)

*Primary Examiner* — Rafael O De Leon Domenech
(74) *Attorney, Agent, or Firm* — Rimon P.C.

(57) ABSTRACT

A first flying capacitor circuit and a second flying capacitor circuit are connected in series so as to be in parallel to a high voltage side DC part. A reactor is connected to a positive side terminal of a low voltage side DC part and a midpoint of the first flying capacitor circuit. A midpoint of the second flying capacitor circuit is connected to a negative side terminal of the low voltage side DC part. A node between the first flying capacitor circuit and the second flying capacitor circuit is connected to an intermediate potential node of the high voltage side DC part.

8 Claims, 10 Drawing Sheets

(56) References Cited

U.S. PATENT DOCUMENTS

| | | | |
|---|---|---|---|
| 2012/0217943 A1 | 8/2012 | Haddad | |
| 2012/0319664 A1* | 12/2012 | Fujii | H02J 7/345 |
| | | | 323/271 |
| 2013/0241290 A1* | 9/2013 | Higuchi | H02M 1/14 |
| | | | 333/175 |
| 2014/0265605 A1* | 9/2014 | Ishigaki | H02M 1/088 |
| | | | 307/80 |
| 2015/0009734 A1 | 1/2015 | Stahl et al. | |
| 2017/0149336 A1* | 5/2017 | Kidera | H02M 7/5387 |
| 2017/0155321 A1* | 6/2017 | Kidera | H02M 7/4837 |
| 2020/0350817 A1 | 11/2020 | De et al. | |
| 2021/0367532 A1 | 11/2021 | Kidera et al. | |
| 2022/0045622 A1* | 2/2022 | Oi | H02M 7/5387 |

FOREIGN PATENT DOCUMENTS

| | | |
|---|---|---|
| JP | 2008-141871 A | 6/2008 |
| JP | 2011-010519 A | 1/2011 |
| JP | 2012-182977 A | 9/2012 |
| JP | 2013-192383 A | 9/2013 |
| WO | 2019/066929 A1 | 4/2019 |
| WO | 2019/069654 A1 | 4/2019 |

OTHER PUBLICATIONS

Wei Qian et al: "A multilevel dc-dc converter with high voltage gain and reduced component rating and count", Applied Power Electronics Conference and Exposition (APEC), 2011 Twenty-Sixth Annual IEEE, IEEE, Mar. 6, 2011 (Mar. 6, 2011), pp. 1146-1152, XP032014022.

International Search Report received in PCT/JP2020/024286 on Aug. 18, 2020, with Machine English Translation.

* cited by examiner

| SWITCHING PATTERN | | | | |
|---|---|---|---|---|
| | INPUT/OUTPUT VOLTAGE ON LOW-VOLTAGE SIDE | | | |
| | MODE(a) | MODE(b) | MODE(c) | MODE(d) |
| | 1/2E | 1/2E | E | 0 |
| S1,S8 | OFF | ON | ON | OFF |
| S2,S7 | ON | OFF | ON | OFF |
| S3,S6 | OFF | ON | OFF | ON |
| S4,S5 | ON | OFF | OFF | ON |

$V_L = 1/2E$ (CHARGE)

$V_L = 1/2E$ (DISCHARGE)

$V_L = E$ $V_L = 0$ $V_L = 1/2E$ (DISCHARGE)

$V_L = 1/2E$ (CHARGE)

$V_L = E$ $V_L = 0$

DC/DC CONVERTING DEVICE INCLUDING FLYING CAPACITOR CIRCUITS

CROSS REFERENCE

This application is the U.S. National Phase under 35 U.S.C. § 371 of International Application No. PCT/JP2020/024286, filed on Jun. 22, 2020, which claims priority to Japanese Application No. 2019-151285, filed on Aug. 21, 2019, the entire contents are hereby incorporated by reference.

TECHNICAL FIELD

The present disclosure relates to a DC-DC converter for converting a DC power into a DC power of a different voltage.

BACKGROUND ART

In a power conditioner connected to a solar cell, a storage cell, a fuel cell, etc. a DC/DC converter and an inverter are used. It is desired that an DC/DC converter and an inverter offer highly efficient power conversion and be designed to have a small size. As a DC/DC converter to meet the requirement, there is proposed a multi-level power converter in which a flying capacitor circuit (comprised of four switching elements and a flying capacitor connected in parallel between the second switching element and the third switching element) is connected in a stage following the reactor, and the voltage at the node between the reactor and the flying capacitor circuit is available in three levels (see, for example, patent literature 1).

A multi-level power converter can be configured such that the voltage applied to each switching element is small so that the switching loss is reduced and highly efficient power conversion is realized accordingly. The three-level configuration of the multi-level power converter using a flying capacitor circuit as described above makes it possible to reduce the voltage applied to each switching element forming the flying capacitor circuit to ½ times the DC bus voltage.

This makes it possible to form the circuit with switching elements having a relatively low withstand voltage (e.g., 300 V) without using switching elements having a relatively high withstand voltage (e.g., 600 V) used in a full-bridge part of an inverter. Switching elements having a low withstand voltage are less expensive than switching elements having a high withstand voltage and have small conduction loss during power conversion, small switching loss, etc. and so contribute to even higher efficiency.

[Patent Literature 1] JP2013-192383

SUMMARY OF INVENTION

Technical Problem

However, use of switching elements having a withstand voltage of 300 V in applications where the operating voltage is relatively high (e.g., 450 V) results in smaller loss as compared with a case of using switching elements having a withstand voltage of 600 V, but the benefit of smaller loss will be limited as a whole because of conduction of multiple switching elements.

The present disclosure addresses the above-described issue, and a purpose thereof is to provide a DC-DC power converter that realizes even higher efficiency by making it possible to use switching elements having an even lower withstand voltage.

Solution to Problem

A DC-DC converter according to an embodiment of the present disclosure includes: a first flying capacitor circuit and a second flying capacitor circuit connected in series so as to be in parallel to a high voltage side DC part; and a reactor connected between a positive side terminal of a low voltage side DC part and a midpoint of the first flying capacitor circuit. A midpoint of the second flying capacitor circuit is connected to a negative side terminal of the low voltage side DC part, and a node between the first flying capacitor circuit and the second flying capacitor circuit is connected to an intermediate potential node of the high voltage side DC part.

Advantageous Effects of Invention

The present disclosure offers a DC-DC converter that realizes even higher efficiency by making it possible to use switching elements having an even lower withstand voltage.

DESCRIPTION OF EMBODIMENTS

Figures 1, 2:
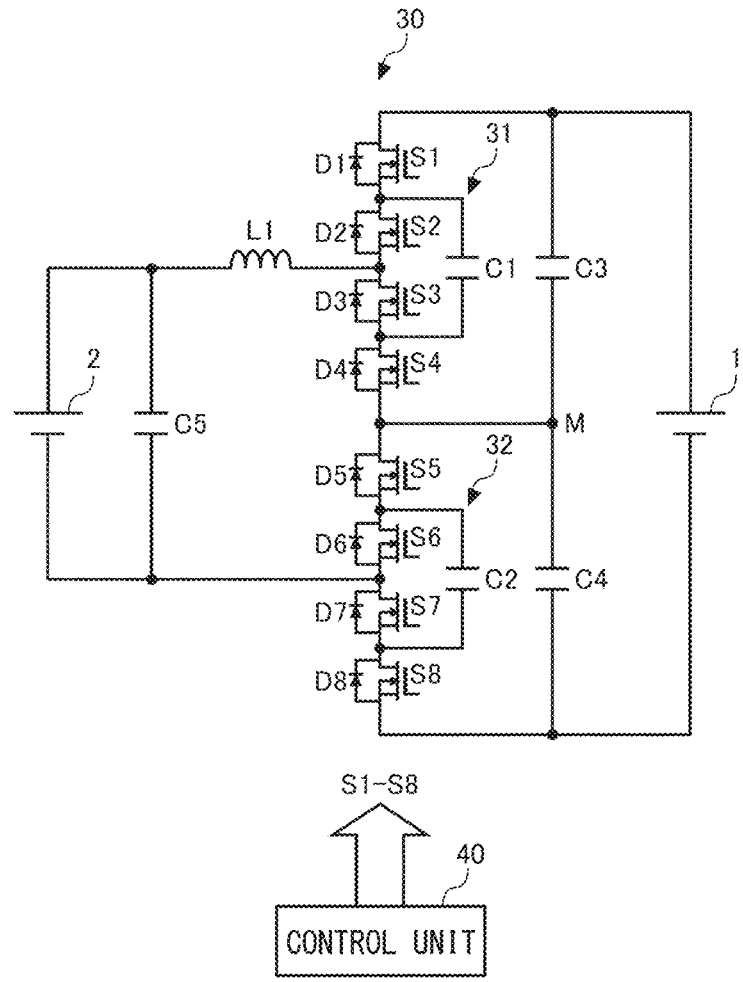
FIG. 1 shows a configuration of a DC-DC converter according to an embodiment.
FIG. 2 shows a list of switching patterns of the first switching element S1—the eighth switching element S8 of the DC-DC converter according to the embodiment.

FIG. 1 shows a configuration of a DC-DC converter 3 according to an embodiment. A DC-DC converter 3 according to the embodiment is a bidirectional step-up and step-down DC-DC converter. The DC-DC converter 3 can step up a DC power supplied from a second DC power source 2 and supply the stepped-up voltage to a first DC power source 1. The DC-DC converter 3 can also step down a DC power supplied from the first power source 1 and supplies the stepped-down voltage to the second DC power source 2. In this specification, it is assumed that the second DC power source 2 is a power source of a lower voltage than that of the first DC power source 1.

The second DC power source 2 is, for example, a storage cell, an electric double layer capacitor, etc. The first DC power source 1 is, for example, a DC bus to which a bidirectional DC-AC inverter is connected. The AC side of the bidirectional DC-AC inverter is connected to a commercial power system and an AC load in applications of power storage systems. In applications of electric vehicles, it is connected to a motor (provided with a regenerative function). In applications of power storage systems, a DC-DC converter for solar cells or a DC-DC converter for other storage cells may further be connected to the DC bus.

The DC-DC converter 3 includes a DC-DC conversion unit 30 and a control unit 40. The DC-DC conversion unit 30 includes an input capacitor C5, a reactor L1, a first flying capacitor circuit 31, a second flying capacitor circuit 32, a first division capacitor C3, and a second division capacitor C4.

The input capacitor C5 is connected in parallel to the second DC power source 2. The first division capacitor C3 and the second division capacitor C4 are connected in series between the positive side buss and the negative side bus of the first DC power source 1. The first division capacitor C3 and the second division capacitor C4 have a function of dividing the voltage of the first DC power source 1 to ½ and a function as a snubber capacitor for suppressing a surge voltage produced in the DC-DC conversion unit 30. In this specification, the configuration preceding the input capacitor C5 will be referred to as a low voltage side DC part, and the configuration following the first division capacitor C3 and the second division capacitor C4 will be referred to as a high voltage side DC part.

The first flying capacitor circuit 31 and the second flying capacitor circuit 32 are connected in series so as to be in parallel to the high voltage side DC part. The reactor L1 is connected in series between the positive side terminal of the low voltage side DC part and the midpoint of the first flying capacitor circuit 31. The negative side terminal of the low voltage side DC part and the midpoint of the second flying capacitor circuit 32 are connected. The node between the first flying capacitor circuit 31 and the second flying capacitor circuit 32 is connected to the intermediate potential node M of the high voltage side DC part (the voltage division node between the first division capacitor C3 and the second division capacitor C4).

The first division capacitor C3 and the second division capacitor C4 can be omitted. In that case, the node between the first flying capacitor circuit 31 and the second flying capacitor circuit 32 may not necessarily be connected to the intermediate potential node M of the high voltage side DC part.

The first flying capacitor circuit 31 includes a first switching element S1, a second switching element S2, a third switching element S3, a fourth switching element S4, and a first flying capacitor C1. The first switching element S1, the second switching element S2, the third switching element S3, and the fourth switching element S4 are connected in series and are connected between the positive side bus and the intermediate potential node M of the high voltage side DC part. The first flying capacitor C1 is connected between the node coupled to the first switching element S1 and the second switching element S2 and the node coupled to the third switching element S3 and the fourth switching element S4. The first flying capacitor C1 is charged and discharged by the first switching element S1—the fourth switching element S4.

A potential in a range between a first voltage E[V] of the first DC power source 1 applied to the upper side terminal of the first switching element S1 and ½E[V] applied to the lower side terminal of the fourth switching element S4 is produced at the midpoint of the first flying capacitor circuit 31. The first flying capacitor C1 is precharged to produce a voltage ¼E[V] and is repeatedly charged and discharged around ¼E[V]. Therefore, three levels of potential, i.e., E[V], ¾[V], and ½E[V], generally, is produced at the midpoint of the first flying capacitor circuit 31.

The second flying capacitor circuit 32 includes a fifth switching element S5, a sixth switching element S6, a seventh switching element S7, an eighth switching element S8, and a second flying capacitor C2. The fifth switching element S5, the sixth switching element S6, the seventh switching element S7, and the eighth switching element S8 are connected in series and are connected between the intermediate potential node M and the negative side bus of the high voltage side DC part. The second flying capacitor C2 is connected between the node coupled to the fifth switching element S5 and the sixth switching element S6 and the node coupled to the seventh switching element S7 and the eighth switching element S8. The second flying capacitor C2 is charged and discharged by the fifth switching element S5—the eighth switching element S8.

A potential in a range between ½E[V] applied to the upper side terminal of the fifth switching element S5 and 0[V] applied to the lower side terminal of the eighth switching element S8 is produced at the midpoint of the second flying capacitor circuit 32. The second flying capacitor C2 is precharged to produce a voltage ¼E[V] and is repeatedly charged and discharged around ¼E[V]. Therefore, three levels of potential, i.e., ½E[V], ¼E[V], and 0E[V], generally, is produced at the midpoint of the second flying capacitor circuit 32.

A first diode D1—an eighth diode D8 are formed/connected to the first switching element S1—the eighth switching element S8, respectively, in an antiparallel manner.

It is preferred that switching elements having a withstand voltage lower than the voltage of the first DC power source 1 and the second DC power source 2 be used in the first switching element S1—the eighth switching element S8. Hereinafter, an example in which N-channel MOSFETs having a withstand voltage of 150 V are used in the first switching element S1—the eighth switching element S8 is assumed in this embodiment. A parasitic diode is formed in direction from the source to the drain in an N-channel MOSFET (Metal-Oxide-Semiconductor Field-Effect Transistor).

An IGBT (Insulated Gate Bipolar Transistor) or a bipolar transistor may be used in the first switching element S1—the eighth switching element S8. In that case, a parasitic diode is not formed in the first switching element S1—the eighth switching element S8, and external diodes are connected to the first switching element S1—the eighth switching element S8, respectively, in an antiparallel manner. A wide band gap semiconductor, in which silicon carbide (SiC), gallium nitride (GaN), gallium oxide ($Ga_2O_3$), diamond (C), etc. are used, may be used as well as an ordinary silicon (Si) semiconductor.

A first voltage sensor for detecting a voltage across the low voltage side DC part, a current sensor for detecting a current flowing in the reactor L1, and a second voltage sensor for detecting a voltage across the high voltage side DC part are provided (not shown in FIG. 1), and the respective measured values are output to the control unit 40.

The control unit 40 can control the first flying capacitor circuit 31 and the second flying capacitor circuit 32 to transfer a DC power from the low voltage side DC part to the high voltage side DC part in a step-up operation. The control unit 40 can also transfer a DC power from the high voltage side DC part to the low voltage side DC part in a step-down operation. More specifically, the control unit 40 is configured to control the first switching element S1—the eighth switching element S8 to be on or off by supplying a driving signal (a PWM (pulse width modulation) signal) to the gate terminals of the first switching element S1—the eighth switching element S8 and to transfer an electric power bidirectionally in a step-up operation or a step-down operation.

The configuration of the control unit 40 can be realized by cooperation of hardware resources and software resources or only by hardware resources. An analog device, microcomputer, DSP, ROM, RAM, FPGA, ASIC, and other LSIs can be used as hardware resources. Programs such as firmware can be used as software resources.

FIG. 2 shows a list of switching patterns of the first switching element S1—the eighth switching element S8 of the DC-DC converter 3 according to the embodiment. In the switching patterns shown in FIG. 2, the pair comprised of the first switching element S1 and the eighth switching element S8 and the pair comprised of the fourth switching element S4 and the fifth switching element S5 are complementary. Further, the pair comprised of the second switching element S2 and the seventh switching element S7 and the pair comprised of the third switching element S3 and the sixth switching element S6 are complementary.

The control unit 40 uses four modes to perform a step-up operation or a step-down operation. In mode a, the control unit 40 controls the second switching element S2, the fourth switching element S4, the fifth switching element S5, and the seventh switching element S7 to be in an on state and controls the first switching element S1, the third switching element S3, the sixth switching element S6, and the eighth switching element S8 to be in an off state. In mode a, the voltage between the midpoint of the first flying capacitor circuit 31 and the midpoint of the second flying capacitor circuit 32 (i.e., the input/output voltage VL on the low voltage side) is ½E.

In mode b, the control unit 40 controls the first switching element S1, the third switching element S3, the sixth switching element S6, and the eighth switching element S8 to be in an on state and controls the second switching element S2, the fourth switching element S4, the fifth switching element S5, and the seventh switching element S7 to be in an off state. In mode b, the input/output voltage VL on the low voltage side between the first flying capacitor circuit 31 and the second flying capacitor circuit 32 is ½E.

In mode c, the control unit 40 controls the first switching element S1, the second switching element S2, the seventh switching element S7, and the eighth switching element S8 to be in an on state and controls the third switching element S3, the fourth switching element S4, the fifth switching element S5, and the sixth switching element S6 to be in an off state. In mode c, the input/output voltage VL on the low voltage side between the first flying capacitor circuit 31 and the second flying capacitor circuit 32 is E.

In mode d, the control unit 40 controls the third switching element S3, the fourth switching element S4, the fifth switching element S5, and the sixth switching element S6 to be in an on state and controls the first switching element S1, the second switching element S2, the seventh switching element S7, and the eighth switching element S8 to be in an off state. In mode d, the input/output voltage VL on the low voltage side between the first flying capacitor circuit 31 and the second flying capacitor circuit 32 is 0.

FIGS. 3A-3D are circuit diagrams showing the current paths in the respective switching patterns during a step-up operation. FIGS. 4A-4D are circuit diagrams showing the current paths in the respective switching patterns during a step-down operation. To simplify the drawings, MOSFETs are illustrated with simple switch symbols.

Figure 3A:
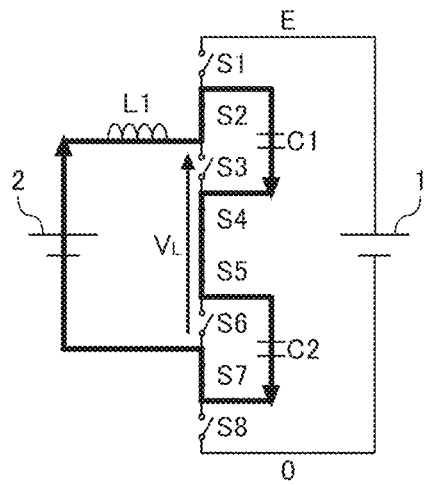
FIGS. 3A-3D are circuit diagrams showing the current paths in the respective switching patterns during a step-up operation.
Figure 3B:
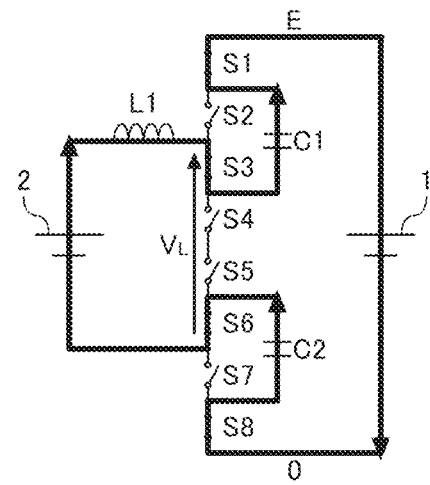
Figure 3C:
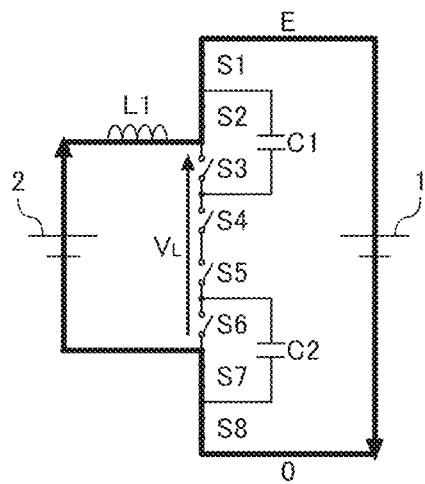
Figure 3D:
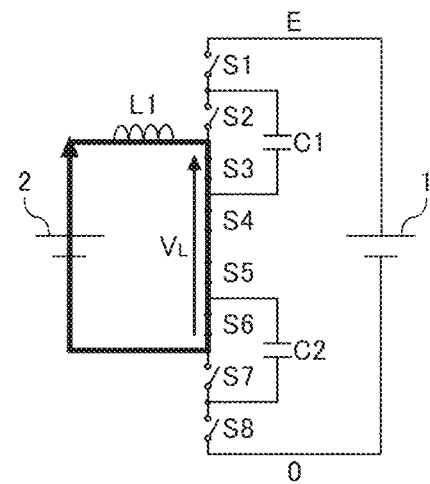
Figure 4A:
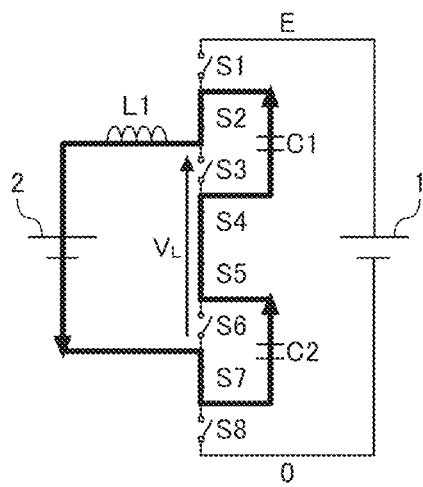
FIGS. 4A-4D are circuit diagrams showing the current paths in the respective switching patterns during a step-down operation.
Figure 4B:
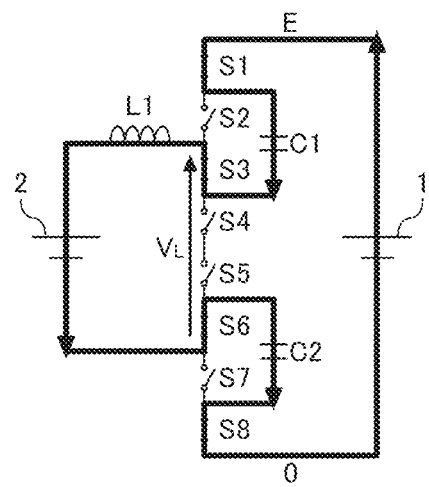
Figure 4C:
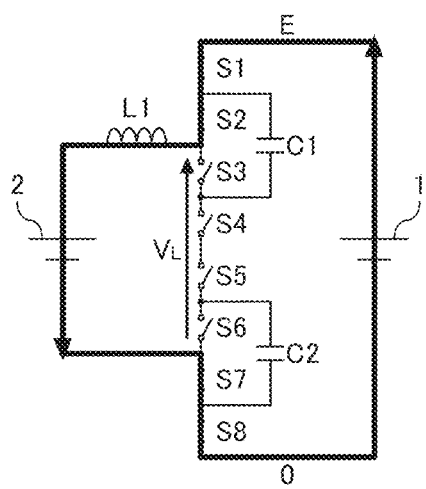
Figure 4D:
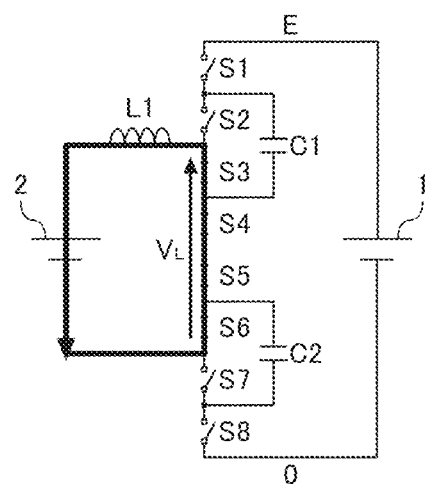

FIG. 3A shows a current path in mode a during a step-up operation, FIG. 3B shows a current path in mode b during a step-up operation, FIG. 3C shows a current path in mode c during a step-up operation, and FIG. 3D shows a current path in mode d during a step-up operation. Similarly, FIG. 4A shows a current path in mode a during a step-down operation, FIG. 4B shows a current path in mode b during a step-down operation, FIG. 4C shows a current path in mode c during a step-down operation, and FIG. 4D shows a current path in mode d during a step-down operation.

The direction of currents are reversed during a step-up operation and during a step-down operation. In mode a, the first flying capacitor C1 and the second flying capacitor C2 are charged during a step-up operation, as shown in FIG. 3A, and the first flying capacitor C1 and the second flying capacitor C2 are discharged during a step-down operation, as shown in FIG. 4A. In mode b, the first flying capacitor C1 and the second flying capacitor C2 are discharged during a step-up operation, as shown in FIG. 3B, and the first flying capacitor C1 and the second flying capacitor C2 are charged during a step-down operation, as shown in FIG. 4B.

When power is transferred from the low voltage side DC part to the high voltage side DC part in a step-up operation, the control unit 40 sets a requested current value in the positive direction and controls the duty ratio (on period) of the first switching element S1—the eighth switching element S8 so that the measured value of the current flowing in the reactor L1 maintains the requested current value in the positive direction. Conversely, when power is transferred from the high voltage side DC part to the low voltage side DC part in a step-down operation, the control unit 40 sets a requested current value in the negative direction and controls the duty ratio (on period) of the first switching element S1—the eighth switching element S8 so that the measured value of the current flowing in the reactor L1 maintains the requested current value in the negative direction.

Further, the control unit 40 uses mode a, mode b, and mode c to transfer power when the proportion between the voltage of the low voltage side DC part and the voltage of the high voltage side DC part (hereinafter, defined as a step-up ratio) is smaller than a predefined value. Further, the control unit 40 uses mode a, mode b, and mode d to transfer power when the step-up ratio is larger than the predefined value. Further, the control unit 40 uses mode a and mode b to transfer power when the step-up ratio matches the predefined value.

The voltage of the low voltage side DC part and the voltage of the high voltage side DC part are measured by voltage sensors, respectively. The predefined value is set in accordance with the proportion between a total, i.e., a total voltage ½E, of the voltage of the first flying capacitor C1 and the voltage of the second flying capacitor C2 and the voltage E of the first DC power source 1. In this embodiment, the predefined value is set to 2. When the proportion between the voltage of the low voltage side DC part and the voltage of the high voltage side DC part is defined by a step-down ratio, the predefined value is set to ½.

The control unit 40 generates a duty ratio so that the requested current value and the measured value of the current flowing in the reactor L1 match and the voltages of the first flying capacitor C and the voltage of the second flying capacitor C2 are ¼E, respectively. More specifically, the smaller the current flowing in the reactor L1 relative to the requested current value, the higher the duty ratio; and the larger the current, the lower duty ratio.

Figure 5:
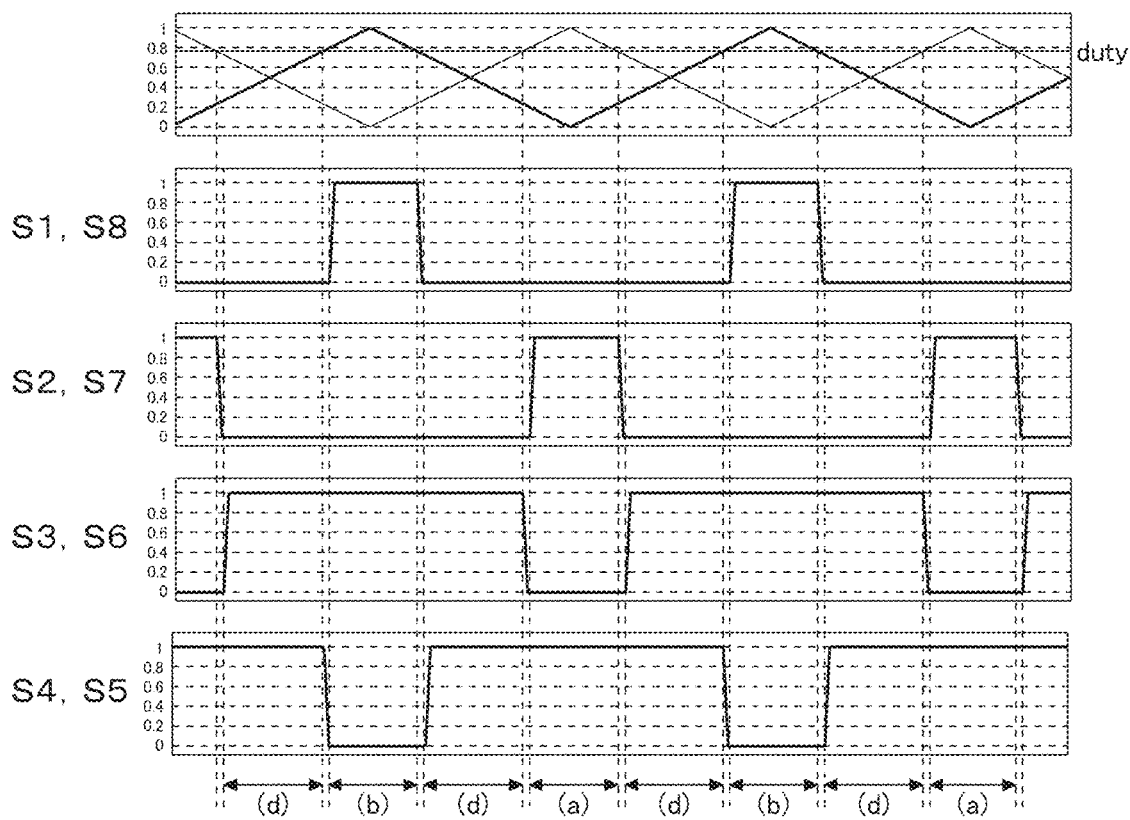
FIG. 5 is a timing chart showing an exemplary switching pattern of the first switching element—the eighth switching element in the case the step-up ratio larger than 2.
Figure 6:
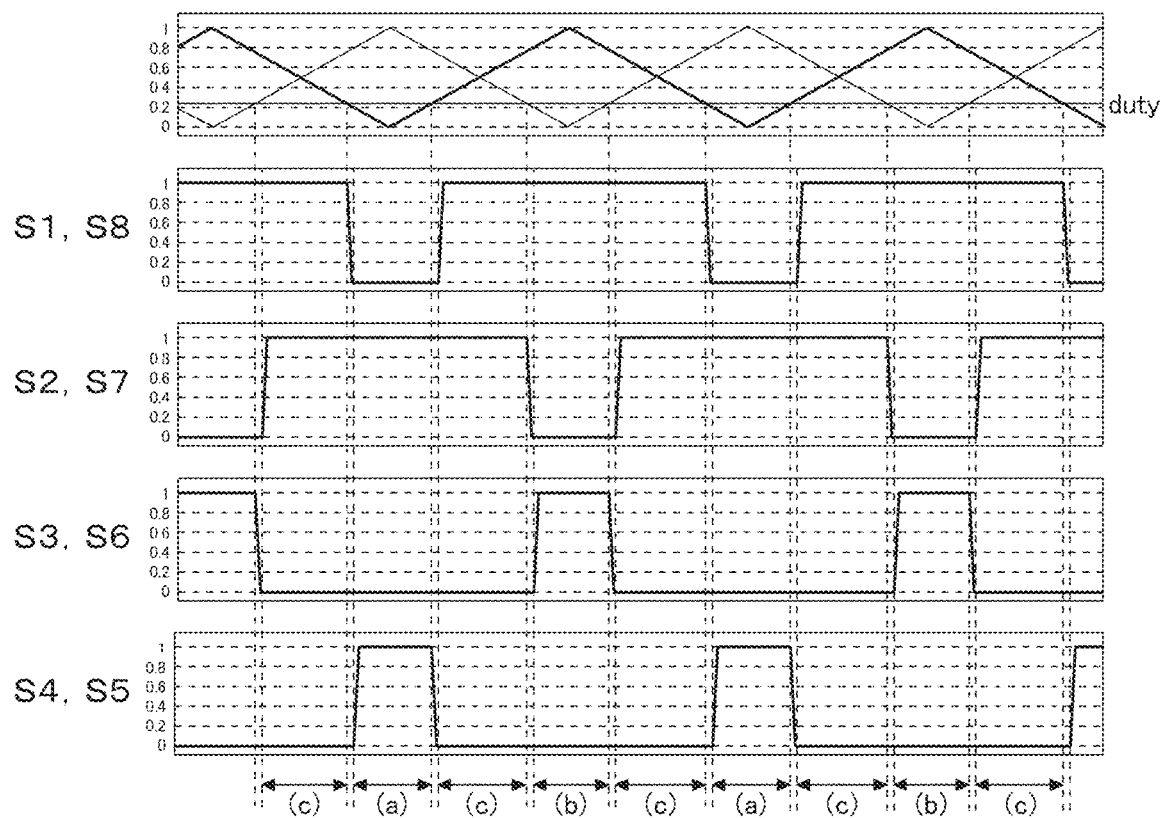
FIG. 6 is a timing chart showing an exemplary switching pattern of the first switching element—the eighth switching element in the case of the step-up ratio smaller than 2.

FIG. 5 is a timing chart showing an exemplary switching pattern of the first switching element S1—the eighth switching element S8 in the case of the step-up ratio larger than 2. FIG. 6 is a timing chart showing an exemplary switching pattern of the first switching element S1—the eighth switching element S8 in the case of the step-up ratio smaller than 2. FIGS. 5 and 6 show an example of control wherein the double-carrier driving scheme is used. In the double carrier driving scheme, two carrier signals with a 180° phase displacement (triangular waves in FIGS. 5 and 6) are used. The duty ratio duty is a threshold value compared with the two carrier signals. When the step-up ratio is larger than 2, the duty ratio duty assumes a value in a range 0.5-1.0. When the step-up ratio is smaller than 2, the duty ratio duty assumes a value in a range 0.0-0.5.

The first gate signal supplied to the first switching element S1 and the eighth switching element S8 and the fourth gate signal supplied to the fourth switching element S4 and the fifth switching element S5 are generated according to the result of comparison between the carrier signal indicated by the bold line and the duty ratio duty. More specifically, the first gate signal is on and the fourth gate signal is off in a zone in which the carrier signal in the bold line is higher than the duty ratio duty. The first gate signal is off and the fourth gate signal is on in a zone in which the carrier signal in the bold line is lower than the duty ratio duty. The first gate signal and the fourth gate signal are complementary. Each time the on/off of the first gate signal and the fourth gate signal is switched, a dead time, during which the first gate signal and the fourth gate signal are off at the same time, is provided.

The second gate signal supplied to the second switching element S2 and the seventh switching element S7 and the third gate signal supplied to the third switching element S3 and the sixth switching element S6 are generated according to the result of comparison between the carrier signal indicated by the thin line and the duty ratio duty. More specifically, the second gate signal is on and the third gate signal is off in a zone in which the carrier signal in the thin line is higher than the duty ratio duty. The second gate signal is off and the third gate signal is on in a zone in which the carrier signal in the thin line is lower than the duty ratio duty. The second gate signal and the third gate signal are complementary. Each time the on/off of the second gate signal and the third gate signal is switched, a dead time, during which the second gate signal and the third gate signal are off at the same time, is provided.

When the step-up ratio is larger than 2, the control unit 40 switches between mode a and mode b alternately and inserts mode d each time the mode is switched. In other words, control unit 40 switches the mode in the order mode a→mode d→mode b→mode d→mode a→mode d→mode b→mode d . . . . While the duty ratio duty remains unchanged, the duration of mode a and that of mode b will be equal, and the voltages of the first flying capacitor C1 and the second flying capacitor C2 are maintained at ¼E, respectively. When the step-up ratio is larger than 2, the higher the duty ratio duty, the longer the duration of mode d with respect to the duration of mode a and mode b, and the larger the quantity of energy transmitted.

When the step-up ratio is smaller than 2, the control unit 40 switches between mode a and mode b alternately and inserts mode c each time the mode is switched. In other words, control unit 40 switches the mode in the order mode a→mode c→mode b→mode c→mode a→mode c→mode b→mode c . . . . While the duty ratio duty remains unchanged, the duration of mode a and that of mode b will be equal, and the voltages of the first flying capacitor C1 and the second flying capacitor C2 are maintained at ¼E, respectively. When the step-up ratio is smaller than 2, the higher the duty ratio duty, the longer the duration of mode c with respect to the duration of mode a and mode b, and the shorter the quantity of energy transmitted.

When the step-up ratio is ideally maintained at 2 and the voltages of the first flying capacitor C1 and the second flying capacitor C2 are ideally maintained at ¼E, the Duty Ratio Duty is Maintained at 0.5.

When the total of the voltage of the first flying capacitor C1 and the voltage of the second flying capacitor C2 falls below ½E, the control unit 40 increases the duration of one of mode a and mode b in which charging takes place, so as to approximate the total voltage to ½E. Conversely, when total of the voltage of the first flying capacitor C1 and the voltage of the second flying capacitor C2 exceeds ½E, the control unit 40 increases the duration of one of mode a and mode b in which discharging takes place, so as to approximate the total voltage to ½E.

Alternatively, the control unit 40 may not use the first flying capacitor C1 and the second flying capacitor C2 and cause the DC-DC conversion unit 30 to operate as an ordinary step-up chopper by switching mode c and mode d alternately. In this case, switching of the operating mode according to the step-up ratio does not occur.

According to the embodiment described above, the switching unit that follows the reactor L1 is comprised of the first flying capacitor circuit 31 and the second flying capacitor circuit 32 connected in series so as to be in parallel to the high voltage side DC part. This allows using switching elements having a low withstand voltage (e.g., MOSFETs having a withstand voltage of 150 V) in the first switching element S1—the eighth switching element S8. By using switching elements having a low withstand voltage, the conduction loss of the switching elements can be reduced, and the efficiency of the DC-DC converter 3 can be increased. Using switching elements having a low withstand voltage also allows reducing heat dissipation and reducing the size of components for heat dissipation. Using switching elements having a low withstand voltage also allows high-frequency operation with low switching loss so that the size of passive components can be decreased as well.

By switching the mode according the step-up ratio, the quantity of energy stored in the reactor L1 can be changed. More specifically, the converter operates in mode a, mode b, and mode c when the step-up ratio is smaller than 2 and operates in mode a, mode b, and mode d when the step-up ratio is larger than 2. This makes it possible to build the DC-DC converter 3 adapted to an extensive voltage range of the second DC power source 2 and the first DC power source 1. Further, by controlling the voltages of the first flying capacitor C1 and the second flying capacitor C2 to be ¼E, respectively, the withstand voltage of the first switching elements S1—the eighth switching element S8 is prevented from being exceeded.

Described above is an explanation of the present disclosure based on the embodiment. The embodiment is intended to be illustrative only and it will be obvious to those skilled in the art that various modifications to constituting elements and processes could be developed and that such modifications are also within the scope of the present disclosure.

In the embodiment described above, a circuit configuration of a flying capacitor circuit, in which four switching elements connected in series and one flying capacitor are used, is given as an example. A flying capacitor circuit in which the number of stages is increased may also be used.

Figure 7A:
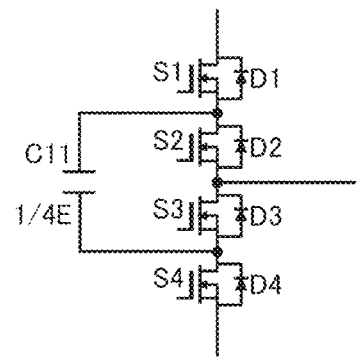
FIGS. 7A-7C show exemplary configurations of a flying capacitor circuit.
Figure 7B:
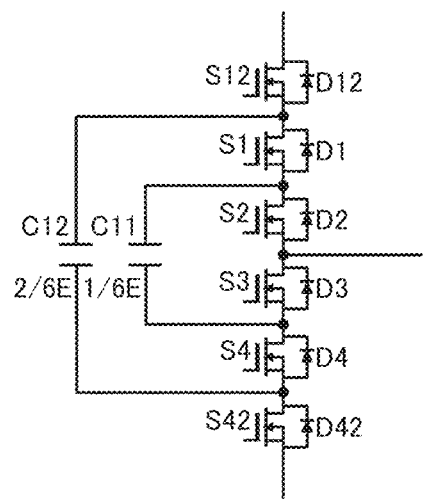
Figure 7C:
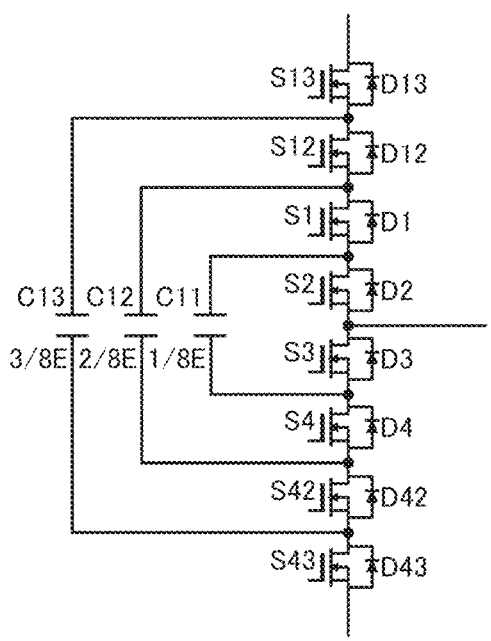

FIGS. 7A-7C show exemplary configurations of a flying capacitor circuit. FIG. 7A shows a flying capacitor circuit with one stage. The flying capacitor circuit shown in FIG. 7A has the same circuit configuration as that of the embodiment described above.

FIG. 7B shows a flying capacitor circuit with two stages. A two-stage flying capacitor circuit includes six switching elements S12, S1, S2, S3, S4, and S42 connected in series and two flying capacitors C11 and C12. The innermost flying capacitor C11 is connected in parallel to the two switching elements S2 and S3 and is controlled to maintain a voltage of ⅙E. In this specification, E denotes the voltage of the high voltage side DC part. The second innermost flying capacitor C12 is connected in parallel to the four switching elements S1, S2, S3, and S4 and is controlled to maintain a voltage of ⅙E.

FIG. 7C shows a flying capacitor circuit with three stages. A three-stage flying capacitor circuit includes eight switching elements S13, S12, S1, S2, S3, S4, S42, and S43 connected in series and three flying capacitors C11, C12, and C13. The innermost flying capacitor C11 is connected in parallel to the two switching elements S2 and S3 and is controlled to maintain a voltage of ⅛E. The second innermost flying capacitor C12 is connected in parallel to the four switching elements S1, S2, S3, and S4 and is controlled to maintain a voltage of ⅖E. The third innermost flying capacitor C13 is connected in parallel to the six switching elements S12, S1, S2, S3, S4, and S42 and is controlled to maintain a voltage of ⅜E.

Figure 8:
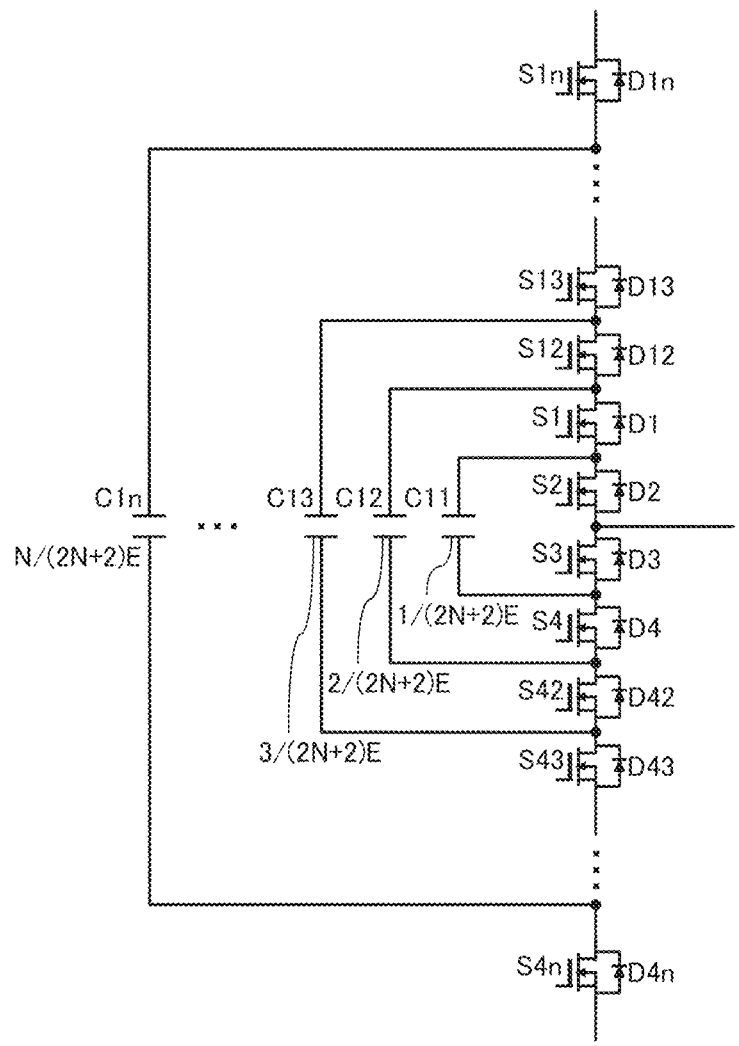
FIG. 8 shows a flying capacitor circuit with N (N is a natural number) stages.

FIG. 8 shows a flying capacitor circuit with N (N is a natural number) stages. An N-stage flying capacitor circuit includes (2N+2) switching elements S1n, ..., S13, S12, S1, S2, S3, S4, S42, S43, ..., S4n connected in series and N flying capacitors C11, C12, C13, ..., C1n. The innermost flying capacitor C11 is connected in parallel to the two switching elements S2 and S3 and is controlled to maintain a voltage of 1/(2N+2)E. The second innermost flying capacitor C12 is connected in parallel to the four switching elements S1, S2, S3, and S4 and is controlled to maintain a voltage of 2/(2N+2)E. The third innermost flying capacitor C13 is connected to the six switching elements S12, S1, S2, S3, S4, and S42 and is controlled to maintain a voltage of 3/(2N+2)E. The outermost flying capacitor C1n is connected to the 2N switching elements S1(n-1), ..., S13, S12, S1, S2, S3, S4, S42, S43, ..., S4(n-1) and is controlled to maintain a voltage of N/(2N+2)E.

In the first flying capacitor circuit 31 and the second flying capacitor circuit 32 shown in FIG. 1, the one-stage flying capacitor circuit shown in FIG. 7A is used. When the one-stage flying capacitor circuit is used, three levels of voltage (E, ½E, 0) can be produced between the midpoint of the first flying capacitor circuit 31 and the midpoint of the second flying capacitor circuit 32. When the two-stage flying capacitor circuit shown in FIG. 7B is used, five levels of voltage (E, ⅔E, ½E, ⅓E, 0) can be produced between the midpoint of the first flying capacitor circuit 31 and the midpoint of the second flying capacitor circuit 32. When the three-stage flying capacitor circuit shown in FIG. 7C is used, seven levels of voltage (E, ¾E, ⅝E, ½E, ⅜E, ¼E, 0) can be produced between the midpoint of the first flying capacitor circuit 31 and the midpoint of the second flying capacitor circuit 32. When the N-stage flying capacitor circuit shown in FIG. 8 is used, (2N+1) levels of voltage can be produced between the midpoint of the first flying capacitor circuit 31 and the midpoint of the second flying capacitor circuit 32.

The greater the number of stages of flying capacitor circuits, the less expensive the switching elements used can be and the lower the withstand voltage, but an increase in the number of stages results in an increase in the number of switching elements used. Therefore, the designer may determine an optimal number of stages of flying capacitor circuits by allowing for the total cost and the total efficiency of conversion. Further, in applications in which the voltage of the high voltage side DC part exceeds 1000 V or in applications in which it exceeds 10000 V, it is useful to increase the number of stages of flying capacitor circuits in order to lower the withstand voltage of the respective switching elements.

Figure 9:
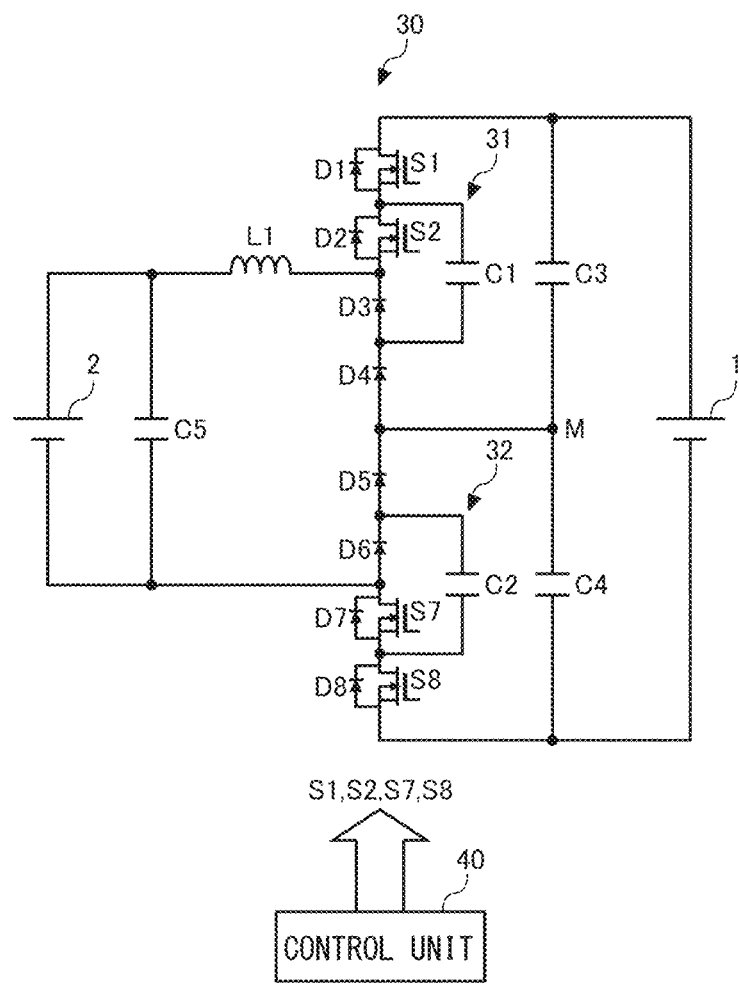
FIG. 9 shows a configuration of the DC-DC converter according to variation 1.

FIG. 9 shows a configuration of the DC-DC converter 3 according to variation 1. The DC-DC converter 3 according to variation 1 is an unidirectional step-down DC-DC converter and cannot transfer power from the low-voltage DC part to the high voltage side DC part. In the DC-DC converter 3 according to variation 1, four diode elements (the third diode D3, the fourth diode D4, the fifth diode D5, and the sixth diode D6) are used in place of the third switching element S3, the fourth switching element S4, the fifth switching element S5, and the sixth switching element S6. In this way, the number of switching elements and the number of drivers can be reduced so that the cost is reduced. The DC-DC converter 3 according to variation 1 can be used as a step-down circuit for producing a reference voltage (e.g., DC 12 V, DC 24 V, DC 48 V) from the first DC power source 1.

Figure 10:
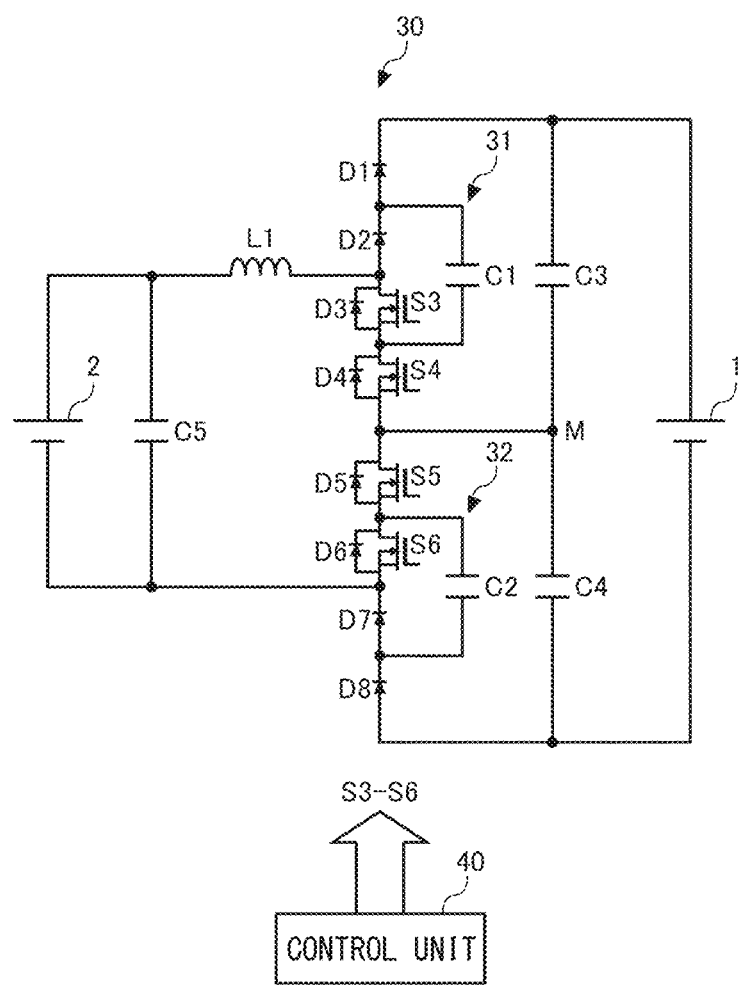
FIG. 10 shows a configuration of the DC-DC converter according to variation 2.

FIG. 10 shows a configuration of the DC-DC converter 3 according to variation 2. The DC-DC converter 3 according to variation 2 is an unidirectional step-up DC-DC converter and cannot transfer power from the high-voltage DC part to the low voltage side DC part. In the DC-DC converter 3 according to variation 2, four diode elements (the first diode D1, the second diode D2, the seventh diode D7, and the eighth diode D8) are used in place of the first switching element S1, the second switching element S2, the seventh switching element S7, and the eighth switching element S8. In this way, the number of switching elements and the number of drivers can be reduced so that the cost can be reduced. The DC-DC converter 3 according to variation 2 can be used as, for example, a step-up circuit for solar cells.

Figure 11:
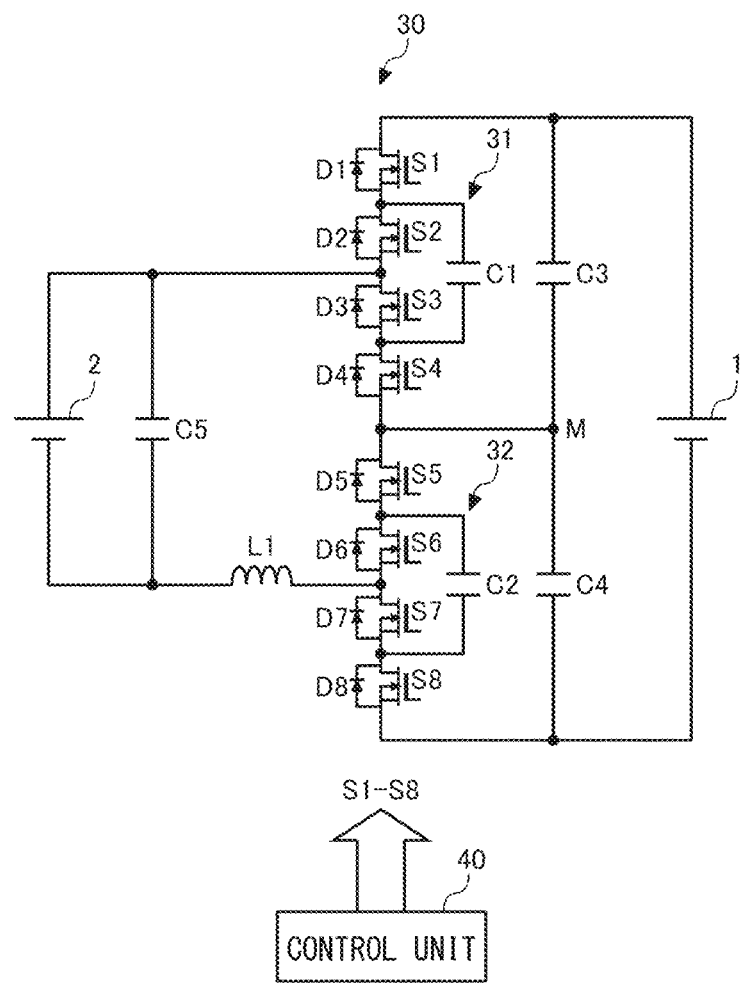
FIG. 11 shows a configuration of the DC-DC converter according to variation 3.

FIG. 11 shows a configuration of the DC-DC converter 3 according to variation 3. In the DC-DC converter 3 shown in FIG. 1, the reactor L1 is connected between the positive side terminal of the low voltage side DC part and the midpoint of the first flying capacitor circuit 31 but may be connected, as shown in FIG. 11, between the negative side terminal of the low-voltage DC part and the midpoint of the second flying capacitor circuit 32. In this case, too, the same benefit as provided by the DC-DC converter 3 shown in FIG. 1 is provided.

The embodiments may be defined by the following items.
[Item 1] A DC-DC converter (3) including: a first flying capacitor circuit (31) and a second flying capacitor circuit (32) connected in series so as to be in parallel to a high voltage side DC part; and a reactor (L1) connected between a positive side terminal of a low voltage side DC part and a midpoint of the first flying capacitor circuit (31), wherein a midpoint of the second flying capacitor circuit (32) is connected to a negative side terminal of the low voltage side DC part, and a node between the first flying capacitor circuit (31) and the second flying capacitor circuit (32) is connected to an intermediate potential node of the high voltage side DC part.

The embodiment makes it possible to use a switching element having a low withstand voltage as a switching element for controlling a current flowing in the reactor (L1) so that the size and efficiency can be reduced.

[Item 2]

A DC-DC converter (3) including: a first flying capacitor circuit (31) and a second flying capacitor circuit (32) connected in series so as to be in parallel to a high voltage side DC part; and a reactor (L1) connected between a negative side terminal of a low voltage side DC part and a midpoint of the second flying capacitor circuit (32), wherein a midpoint of the first flying capacitor circuit (31) is connected to a positive side terminal of the low voltage side DC part, and a node between the first flying capacitor circuit (31) and the second flying capacitor circuit (32) is connected to an intermediate potential node of the high voltage side DC part.

The embodiment makes it possible to use a switching element having a low withstand voltage as a switching element for controlling a current flowing in the reactor (L1) so that the size and efficiency are reduced.

[Item 3]

The DC-DC converter (3) according to item 1 or 2, further including: a control unit (40) that controls the first flying capacitor circuit (31) and the second flying capacitor circuit (32) to perform at least one of power transfer from the low voltage side DC part to the high voltage side DC part in a step-up operation or power transfer from the high voltage side DC part to the low voltage side DC part in a step-down operation.

The embodiment makes it possible to transfer power bidirectionally.

[Item 4]

The DC-DC converter according to item 3, wherein the first flying capacitor circuit (31) includes: a first switching element (S1), a second switching element (S2), a third switching element (S3), and a fourth switching element (S4) connected in series; and a first flying capacitor (C1) connected between a node between the first switching element (S1) and the second switching element (S2) and a node between the third switching element (S3) and the fourth switching element (S4), and the second flying capacitor circuit (32) includes: a fifth switching element (S5), a sixth switching element (S6), a seventh switching element (S7), and an eighth switching element (S8) connected in series; and a second flying capacitor (C2) connected between a node between the fifth switching element (S5) and the sixth switching element (S6) and a node between the seventh switching element (S7) and the eighth switching element (S8).

By connecting eight switching elements (S1-S8) in series so as to be in parallel to the high voltage side DC part, it is possible to use a switching element having a lower withstand voltage than in the related art.

[Item 5]

The DC-DC converter (3) according to item 4, wherein the control unit (40) performs the step-up operation or the step-down operation by using four modes including: a first mode in which the second switching element (S2), the fourth switching element (S4), the fifth switching element (S5), and the seventh switching element (S7) are controlled to be in an on state and the first switching element (S1), the third switching element (S3), the sixth switching element (S6), and the eighth switching element (S8) are controlled to be in an off state; a second mode in which the first switching element (S1), the third switching element (S3), the sixth switching element (S6), and the eighth switching element (S8) are controlled to be in an on state and the second switching element (S2), the fourth switching element (S4), the fifth switching element (S5), and the seventh switching element (S7) are controlled to be in an off state; a third mode in which the first switching element (S1), the second switching element (S2), the seventh switching element (S7), and the eighth switching element (S8) are controlled to be in an on state and the third switching element (S3), the fourth switching element (S4), the fifth switching element (S5), and the sixth switching element (S6) are controlled to be in an off state; and a fourth mode in which the third switching element (S3), the fourth switching element (S4), the fifth switching element (S5), and the sixth switching element (S6) are controlled to be in an on state and the first switching element (S1), the second switching element (S2), the seventh switching element (S7), and the eighth switching element (S8) are controlled to be in an off state.

By using the four modes in combination, various modes of control are made possible.

[Item 6]

The DC-DC converter (3) according to item 5, wherein the control unit (40) uses the first mode, the second mode, and the third mode when a proportion between a voltage of the low voltage side DC part and a voltage of the high voltage side DC part is smaller than a predefined value and uses the first mode, the second mode, and the fourth mode when the proportion is larger than the predefined value.

By switching the mode according to the proportion, the quantity of energy stored in the reactor (L1) can be changed.

[Item 7]

The DC-DC converter (3) according to one of items 4 through 6, wherein the control unit (40) controls a voltage of the first flying capacitor (C1) and a voltage of the second flying capacitor (C2) to be ¼ a voltage of the high voltage side DC part.

This can prevent the withstand voltage of the first switching elements (S1)—the eighth switching element (S8) from being exceeded.

[Item 8]

The DC-DC converter according to one of items 3 through 7, wherein each of the first flying capacitor circuit (31) and the second flying capacitor circuit (32) includes N (N is a natural number) flying capacitors (C1, . . . , C1N), and the control unit (40) controls a voltage of a first flying capacitor (C1) connected innermost to be (1/(2N+2)) times a voltage of the high voltage side DC part, controls a voltage of an N-th flying capacitor (C1N) connected outermost to be (N/(2N+2)) times a voltage of the high voltage side DC part, and produces (2N+1) levels of voltage between the midpoint of the first flying capacitor circuit (31) and the midpoint of the second flying capacitor circuit (32).

According to this embodiment, a switching element having an even lower withstand voltage can be used by increasing the number of stages of the flying capacitor circuit (31, 32).

[Item 9]

The DC-DC converter (3) according to one of claims 1 through 8, wherein a switching element having a withstand voltage lower than a voltage of the high voltage side DC part and a voltage of the low voltage side DC part is used in a plurality of switching elements (S1-S4) included in the first flying capacitor circuit (31) and a plurality of switching elements (S5-S8) included in the second flying capacitor circuit (32).

The embodiment makes it possible to use a switching element having a low withstand voltage so that the size and efficiency can be reduced.

[Item 10]

The DC-DC converter (3) according to item 3, wherein the first flying capacitor circuit (31) includes: a first diode (D1), a second diode (D2), a third switching element (S3), and a fourth switching element (S4) connected in series; and a first flying capacitor (C1) connected between a node between the first diode (D1) and the second diode (D2) and a node between the third switching element (S3) and the fourth switching element (S4), and the second flying capacitor circuit (32) includes: a fifth switching element (S5), a sixth switching element (S6), a seventh diode (D7), and an eighth diode (D8) connected in series; and a second flying capacitor (C2) connected between a node between the fifth switching element (S5) and the sixth switching element (S6) and a node between the seventh diode (D7) and the eighth diode (D8), and wherein the control unit (40) controls the third switching element (S3), the fourth switching element (S4), the fifth switching element (S5), and the sixth switching element (S6) to output a DC power from the low voltage side DC part to the high voltage side DC part in a step-up operation.

By configuring a unidirectional step-up converter, the cost can be reduced.

[Item 11]

The DC-DC converter (3) according to item 3, wherein the first flying capacitor circuit (31) includes: a first switching element (S1), a second switching element (S2), a third diode (D3), and a fourth diode (D4) connected in series; and a first flying capacitor (C1) connected between a node between the first switching element (S1) and the second switching element (S2) and a node between the third diode (D3) and the fourth diode (D4), and the second flying capacitor circuit (32) includes: a fifth diode (D5), a sixth diode (D6), a seventh switching element (S7), and an eighth switching element (S8) connected in series; and a second flying capacitor (C2) connected between a node between the fifth diode (D5) and the sixth diode (D6) and a node between the seventh switching element (S7) and the eighth switching element (S8), and wherein the control unit (40) controls the first switching element (S1), the second switching element (S2), the seventh switching element (S7), and the eighth switching element (S8) to output a DC power from the high voltage side DC part to the low voltage side DC part in a step-down operation.

By configuring a unidirectional step-down converter, the cost can be reduced.

INDUSTRIAL APPLICABILITY

The present disclosure can be used in a multilevel converter in which a flying capacitor is used.

REFERENCE SIGNS LIST 1 first DC power source, 2 second DC power source, 3 DC-DC converter, 30 DC-DC conversion unit, 31, 32 flying capacitor circuit, 40 control unit, S1-S8 switching elements, D1-D8 diode, C1, C2 flying capacitor, C3, C4 division capacitor, C5 input capacitor, L1 reactor

The invention claimed is:

1. A DC-DC converter comprising:
a first flying capacitor circuit and a second flying capacitor circuit connected in series with each other and in parallel to a high voltage side DC part;
a reactor connected between a positive side terminal of a low voltage side DC part and a midpoint of the first flying capacitor circuit; and
a control unit that controls the first flying capacitor circuit and the second flying capacitor circuit to perform at least one of power transfer from the low voltage side DC part to the high voltage side DC part in a step-up operation at a step-up ratio corresponding to the quantity of energy stored in the reactor or power transfer from the high voltage side DC part to the low voltage side DC part in a step-down operation at a step-down ratio corresponding to the quantity of energy stored in the reactor,
wherein a midpoint of the second flying capacitor circuit is connected to a negative side terminal of the low voltage side DC part,
wherein a node between the first flying capacitor circuit and the second flying capacitor circuit is connected to an intermediate potential node of the high voltage side DC part,
wherein the first flying capacitor circuit includes:
    a first switching element, a second switching element, a third switching element, and a fourth switching element connected in series; and
    a first flying capacitor connected between a node between the first switching element and the second switching element and a node between the third switching element and the fourth switching element,
wherein the second flying capacitor circuit includes:
    a fifth switching element, a sixth switching element, a seventh switching element, and an eighth switching element connected in series; and
    a second flying capacitor connected between a node between the fifth switching element and the sixth switching element and a node between the seventh switching element and the eighth switching element, and
wherein the control unit performs the step-up operation or the step-down operation by using four modes including:
    a first mode in which the second switching element, the fourth switching element, the fifth switching element, and the seventh switching element are controlled to be in an on state and the first switching element, the third switching element, the sixth switching element, and the eighth switching element are controlled to be in an off state;
    a second mode in which the first switching element, the third switching element, the sixth switching element, and the eighth switching element are controlled to be in an on state and the second switching element, the fourth switching element, the fifth switching element, and the seventh switching element are controlled to be in an off state;
    a third mode in which the first switching element, the second switching element, the seventh switching element, and the eighth switching element are controlled to be in an on state and the third switching element, the fourth switching element, the fifth switching element, and the sixth switching element are controlled to be in an off state; and a fourth mode in which the third switching element, the fourth switching element, the fifth switching element, and the sixth switching element are controlled to be in an on state and the first switching element, the second switching element, the seventh switching element, and the eighth switching element are controlled to be in an off state.

2. The DC-DC converter according to claim 1, wherein the control unit uses the first mode, the second mode, and the third mode when the step-up ratio from the low voltage side DC part to the high voltage side DC part is smaller than 2 and uses the first mode, the second mode, and the fourth mode when the step-up ratio is larger than 2.

3. The DC-DC converter according to claim 1, wherein the control unit controls a voltage of the first flying capacitor and a voltage of the second flying capacitor to be ¼ a voltage of the high voltage side DC part.

4. The DC-DC converter according to claim 1, wherein each of the first flying capacitor circuit and the second flying capacitor circuit includes N (N is a natural number) flying capacitors, and
the control unit
controls a voltage of a first flying capacitor connected innermost to be (1/(2N+2)) times a voltage of the high voltage side DC part,
controls a voltage of an N-th flying capacitor connected outermost to be (N/(2N+2)) times a voltage of the high voltage side DC part, and
produces (2N+1) levels of voltage between the midpoint of the first flying capacitor circuit and the midpoint of the second flying capacitor circuit.

5. The DC-DC converter according to claim 1, wherein a switching element having a withstand voltage lower than a voltage of the low voltage side DC part is used in the first switching element through the eighth switching element.

6. A DC-DC converter comprising:
a first flying capacitor circuit and a second flying capacitor circuit connected in series with each other and in parallel to a high voltage side DC part;
a reactor connected between a negative side terminal of a low voltage side DC part and a midpoint of the second flying capacitor circuit; and
a control unit that controls the first flying capacitor circuit and the second flying capacitor circuit to perform at least one of power transfer from the low voltage side DC part to the high voltage side DC part in a step-up operation at a step-up ratio corresponding to the quantity of energy stored in the reactor or power transfer from the high voltage side DC part to the low voltage side DC part in a step-down operation at a step-down ratio corresponding to the quantity of energy stored in the reactor,
wherein a midpoint of the first flying capacitor circuit is connected to a positive side terminal of the low voltage side DC part,
wherein a node between the first flying capacitor circuit and the second flying capacitor circuit is connected to an intermediate potential node of the high voltage side DC part,
wherein the first flying capacitor circuit includes:
a first switching element, a second switching element, a third switching element, and a fourth switching element connected in series; and
a first flying capacitor connected between a node between the first switching element and the second switching element and a node between the third switching element and the fourth switching element,
wherein the second flying capacitor circuit includes:
a fifth switching element, a sixth switching element, a seventh switching element, and an eighth switching element connected in series; and
a second flying capacitor connected between a node between the fifth switching element and the sixth switching element and a node between the seventh switching element and the eighth switching element, and
wherein the control unit performs the step-up operation or the step-down operation by using four modes including:
a first mode in which the second switching element, the fourth switching element, the fifth switching element, and the seventh switching element are controlled to be in an on state and the first switching element, the third switching element, the sixth switching element, and the eighth switching element are controlled to be in an off state;
a second mode in which the first switching element, the third switching element, the sixth switching element, and the eighth switching element are controlled to be in an on state and the second switching element, the fourth switching element, the fifth switching element, and the seventh switching element are controlled to be in an off state;
a third mode in which the first switching element, the second switching element, the seventh switching element, and the eighth switching element are controlled to be in an on state and the third switching element, the fourth switching element, the fifth switching element, and the sixth switching element are controlled to be in an off state; and
a fourth mode in which the third switching element, the fourth switching element, the fifth switching element, and the sixth switching element are controlled to be in an on state and the first switching element, the second switching element, the seventh switching element, and the eighth switching element are controlled to be in an off state.

7. A DC-DC converter comprising:
a first flying capacitor circuit and a second flying capacitor circuit connected in series with each other and in parallel to a high voltage side DC part;
a reactor connected between a positive side terminal of a low voltage side DC part and a midpoint of the first flying capacitor circuit; and
a control unit that controls the first flying capacitor circuit and the second flying capacitor circuit to perform power transfer from the low voltage side DC part to the high voltage side DC part in a step-up operation at a step-up ratio corresponding to the quantity of energy stored in the reactor,
wherein a midpoint of the second flying capacitor circuit is connected to a negative side terminal of the low voltage side DC part,
wherein a node between the first flying capacitor circuit and the second flying capacitor circuit is connected to an intermediate potential node of the high voltage side DC part,
wherein the first flying capacitor circuit includes:
a first diode, a second diode, a third switching element, and a fourth switching element connected in series; and a first flying capacitor connected between a node between the first diode and the second diode and a node between the third switching element and the fourth switching element, wherein the second flying capacitor circuit includes:
a fifth switching element, a sixth switching element, a seventh diode, and an eighth diode connected in series; and
a second flying capacitor connected between a node between the fifth switching element and the sixth switching element and a node between the seventh diode and the eighth diode, and wherein the control unit performs the step-up operation by using four modes including:
a first mode in which the fourth switching element, and the fifth switching element are controlled to be in an on state and the third switching element, and the sixth switching element, are controlled to be in an off state;
a second mode in which the third switching element, and the sixth switching element are controlled to be in an on state and the fourth switching element, and the fifth switching element are controlled to be in an off state;
a third mode in which the third switching element, the fourth switching element, the fifth switching element, and the sixth switching element are controlled to be in an off state; and
a fourth mode in which the third switching element, the fourth switching element, the fifth switching element, and the sixth switching element are controlled to be in an on state.

8. A DC-DC converter comprising:
a first flying capacitor circuit and a second flying capacitor circuit connected in series with each other and in parallel to a high voltage side DC part;
a reactor connected between a positive side terminal of a low voltage side DC part and a midpoint of the first flying capacitor circuit; and
a control unit that controls the first flying capacitor circuit and the second flying capacitor circuit to perform power transfer from the high voltage side DC part to the low voltage side DC part in a step-down operation at a step-down ratio corresponding to the quantity of energy stored in the reactor, wherein a midpoint of the second flying capacitor circuit is connected to a negative side terminal of the low voltage side DC part, wherein a node between the first flying capacitor circuit and the second flying capacitor circuit is connected to an intermediate potential node of the high voltage side DC part, wherein the first flying capacitor circuit includes:
a first switching element, a second switching element, a third diode, and a fourth diode connected in series; and
a first flying capacitor connected between a node between the first switching element and the second switching element and a node between the third diode and the fourth diode, wherein the second flying capacitor circuit includes:
a fifth diode, a sixth diode, a seventh switching element, and an eighth switching element connected in series; and
a second flying capacitor connected between a node between the fifth diode and the sixth diode and a node between the seventh switching element and the eighth switching element, and wherein the control unit performs the step-down operation by using four modes including:
a first mode in which the second switching element, and the seventh switching element are controlled to be in an on state and the first switching element, and the eighth switching element are controlled to be in an off state;
a second mode in which the first switching element, and the eighth switching element are controlled to be in an on state and the second switching element, and the seventh switching element are controlled to be in an off state;
a third mode in which the first switching element, the second switching element, the seventh switching element, and the eighth switching element are controlled to be in an on state; and
a fourth mode in which the first switching element, the second switching element, the seventh switching element, and the eighth switching element are controlled to be in an off state.

* * * * *